United States Patent
Kataoka et al.

(10) Patent No.: US 6,376,965 B1
(45) Date of Patent: Apr. 23, 2002

(54) DRIVING DEVICE FOR VIBRATION TYPE ACTUATOR

(75) Inventors: Kenichi Kataoka, Yokohama; Akio Atsuta, Yokosuka; Shinji Yamamoto; Tadashi Hayashi, both of Yokohama; Jun Ito, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,940

(22) Filed: Feb. 18, 2000

(30) Foreign Application Priority Data

Feb. 22, 1999 (JP) .......................................... 11-042793

(51) Int. Cl.[7] .......................... H01L 41/02; H01L 41/08
(52) U.S. Cl. .................. 310/317; 310/316; 310/316.01
(58) Field of Search ................................. 310/316, 317, 310/302, 316.01, 316.02, 316.03

(56) References Cited

U.S. PATENT DOCUMENTS

| | | | |
|---|---|---|---|
| 5,001,404 A | 3/1991 | Kataoka ...................... 318/116 |
| 5,004,964 A | 4/1991 | Kataoka et al. ............. 318/128 |
| 5,134,333 A | 7/1992 | Atsuta ......................... 310/323 |
| 5,157,300 A | 10/1992 | Kataoka et al. ............. 310/323 |
| 5,231,325 A | 7/1993 | Tamai et al. ................. 310/323 |
| 5,247,221 A | 9/1993 | Atsuta ......................... 310/323 |
| 5,285,134 A | 2/1994 | Kataoka ...................... 318/116 |
| 5,298,829 A | 3/1994 | Tsukimoto et al. ......... 310/323 |
| 5,300,850 A | 4/1994 | Okumura et al. ........... 310/323 |
| 5,436,521 A | 7/1995 | Kataoka ...................... 310/317 |
| 5,459,370 A | 10/1995 | Kataoka ...................... 310/317 |
| 5,484,216 A | 1/1996 | Kimura et al. ............... 400/319 |
| 5,539,268 A | 7/1996 | Kataoka ...................... 310/316 |
| 5,612,598 A | 3/1997 | Fukui et al. ................. 318/116 |
| 5,631,516 A | 5/1997 | Kataoka ...................... 310/316 |
| 5,656,881 A | 8/1997 | Atsuta ......................... 310/316 |
| 5,739,621 A | 4/1998 | Atsuta et al. ............... 310/316 |
| 5,874,799 A * | 2/1999 | Mitarai et al. ............. 310/316 |
| 5,889,350 A | 3/1999 | Yamamoto .................. 310/316 |
| 5,920,144 A | 7/1999 | Atsuta ......................... 310/316 |
| 5,939,851 A | 8/1999 | Kataoka et al. ............. 318/611 |
| 5,986,385 A | 11/1999 | Atsuta ......................... 310/323 |
| 6,031,316 A | 2/2000 | Kataoka ...................... 310/316 |
| 6,037,701 A | 3/2000 | Atsuta .................... 310/316.01 |
| 6,049,156 A | 4/2000 | Yamamoto et al. .... 310/316.01 |
| 6,054,795 A | 4/2000 | Yamamoto ............. 310/316.01 |
| 6,084,334 A * | 7/2000 | Yamamoto et al. .... 310/316.01 |

FOREIGN PATENT DOCUMENTS

JP 4-210787 7/1992

\* cited by examiner

*Primary Examiner*—Brian Sircus
*Assistant Examiner*—Michael C. Zarroli
(74) *Attorney, Agent, or Firm*—Fitzpatrick, Cella, Harper & Scinto (57) ABSTRACT

This invention relates to a driving device for a vibration type actuator. In this device, since the characteristics of the actuator change depending on temperature and the like, control characteristics must be optimized. This invention is designed to determine a control gain based on the ratio of the change amount of the frequency of a driving signal that causes the speed change to the change amount of the speed when the driving speed changes a predetermined amount upon driving of the actuator, thereby performing appropriate control.

13 Claims, 11 Drawing Sheets

DRIVING DEVICE FOR VIBRATION TYPE ACTUATOR

BACKGROUND OF THE INVENTION

1. Field of the Invention

The present invention relates to a vibration type actuator driving control device and, more particularly, to a driving control device for a vibration type actuator for obtaining a driving force by exciting a vibration member by applying an AC signal to electromechanical energy conversion element.

2. Related Background Art

Conventionally, in speed control on a vibration type actuator, the actual speed of the vibration type actuator is detected, and the speed of the actuator is brought close to a target value by feeding back the detected value.

Vibration type actuators vary in characteristics and are required to reduce the influences of such variations. For this reason, the characteristics of each vibration type actuator must be measured in advance, and an optimal control state must be ensured by setting a control gain in accordance with the characteristics.

In addition, the characteristics of a vibration type actuator vary with changes in ambient temperature. In the driving control device for the ultrasonic motor, for example, disclosed in Japanese Patent Application Laid-Open No. 4-210787, therefore, a temperature sensor is arranged to set a control gain in accordance with temperature information from the sensor.

SUMMARY OF THE INVENTION

According to one aspect of the application, it is an object to optimize a control gain for a vibration type actuator.

According to one aspect of the application, there is provided a control device for a vibration type actuator for obtaining a driving force by exciting a vibration member by applying an AC signal to an electro-mechanical energy conversion element, comprising, as a gain setting arrangement, an operation control circuit which determines the AC signal with respect to an input control signal, in accordance with a control gain, and controls an operation of the vibration type actuator, a speed commanding circuit which commands a change of an operation speed of the actuator, a changing circuit which changes a value of the control signal in accordance with the changing command for the operation speed, and a gain determining circuit which determines the control gain on the basis of a relationship between a change amount of the value of the control signal and a change amount of speed.

Other features and advantages of the present invention will be apparent from the following detailed description in conjunction with the accompanying drawings.

DETAILED DESCRIPTION OF THE PREFERRED EMBODIMENTS

Embodiments of the present invention will be described below with reference to the accompanying drawings.

(First Embodiment)

Figure 2:
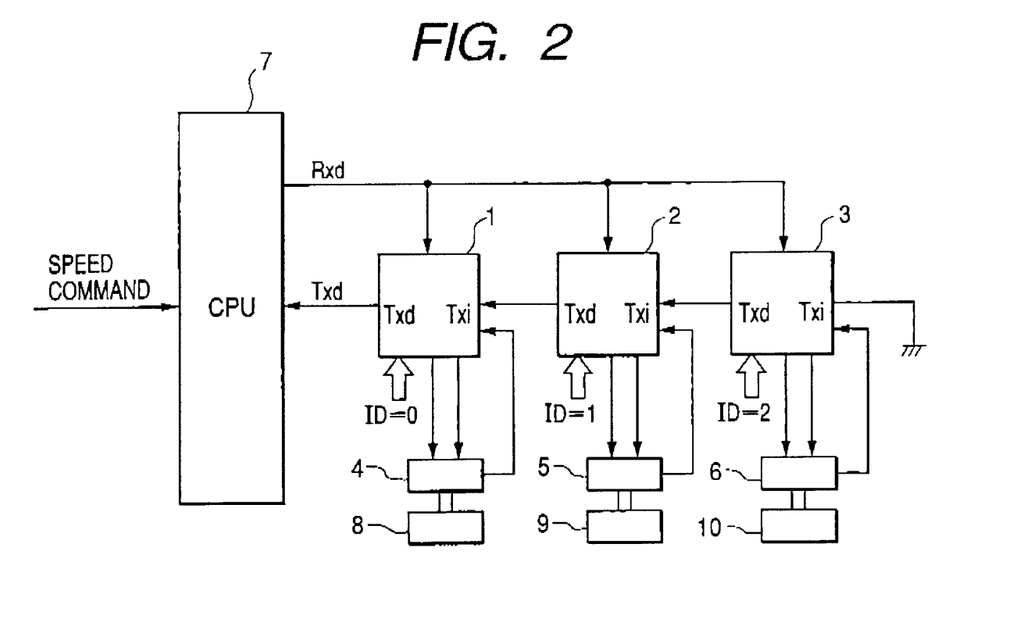
FIG. 2 is a block diagram showing the arrangement of a driving control device for vibration type actuators according to the first embodiment.

FIG. 2 is a block diagram showing the arrangement of a driving control device for vibration type actuators according to the first embodiment of the present invention.

Referring to FIG. 2, operation control circuits 1, 2, and 3 are used for vibration type actuators, and vibration type actuators 4, 5, and 6 are motors generally called ultrasonic motors or vibration motors, which are designed to vibrate vibration members by applying frequency signals having different phases to electro-mechanical energy conversion elements. The element designated by the numeral 7 is a CPU 7. The vibration type actuators 4, 5, and 6 are used to obtain driving forces by exciting the vibration members by applying AC signals to piezoelectric elements as electromechanical energy conversion elements. Speed sensors 8, 9, and 10 are rotary encoders or the like which are used to detect the rotational speeds of the vibration type actuators 4, 5, and 6.

The CPU 7 transmits operation commands to the operation control circuits 1, 2, and 3, respectively, in accordance with commands associated with speed and position, which are sent from a command means (not shown). The operation commands are transmitted using signals Rxd by serial communication using RS232C or the like. Examples of the operation commands are signals for commanding the rotational speeds of the vibration type actuators 4, 5, and 6, signals for commanding the actuators to start and stop, and signals for transferring control setting information about control gains in rotating operation and driving frequencies and driving voltages in start-up operation. ID numbers 0, 1, and 2 are respectively assigned to the operation control circuits 1, 2, and 3, and ID numbers are added to operation commands. Therefore, the operation control circuits for which operation commands are destined can be identified by ID numbers sent together with the operation commands.

The vibration type actuators 4, 5, and 6 are respectively controlled by the operation control circuits 1, 2, and 3 on the basis of corresponding operation commands.

Pieces of control information respectively set in the operation control circuits 1, 2, and 3 in accordance with operation commands and pieces of information about the operation states of the vibration type actuators 4, 5, and 6 are periodically sent to the CPU 7 using the signals Txd. If, for example, the operation control circuits 1, 2, and 3 respectively receive operation commands to return information about rotational speeds or the like from the CPU 7 using the signals Rxd, each speed information from a corresponding one of the speed sensors 8, 9, and 10 is transferred to the adjacent operation control circuit having a smaller ID number. The speed information is sequentially transferred to the operation control circuits in descending order of ID numbers. Finally, this information is sent from the operation control circuit 1 having ID number 0 to the CPU 7 using a signal Txd. In this manner, the CPU 7 periodically acquires information about the operation state of each of the vibration type actuators 4, 5, and 6, and performs speed control gain adjustment and the like on the basis of the acquired information.

Figure 1:
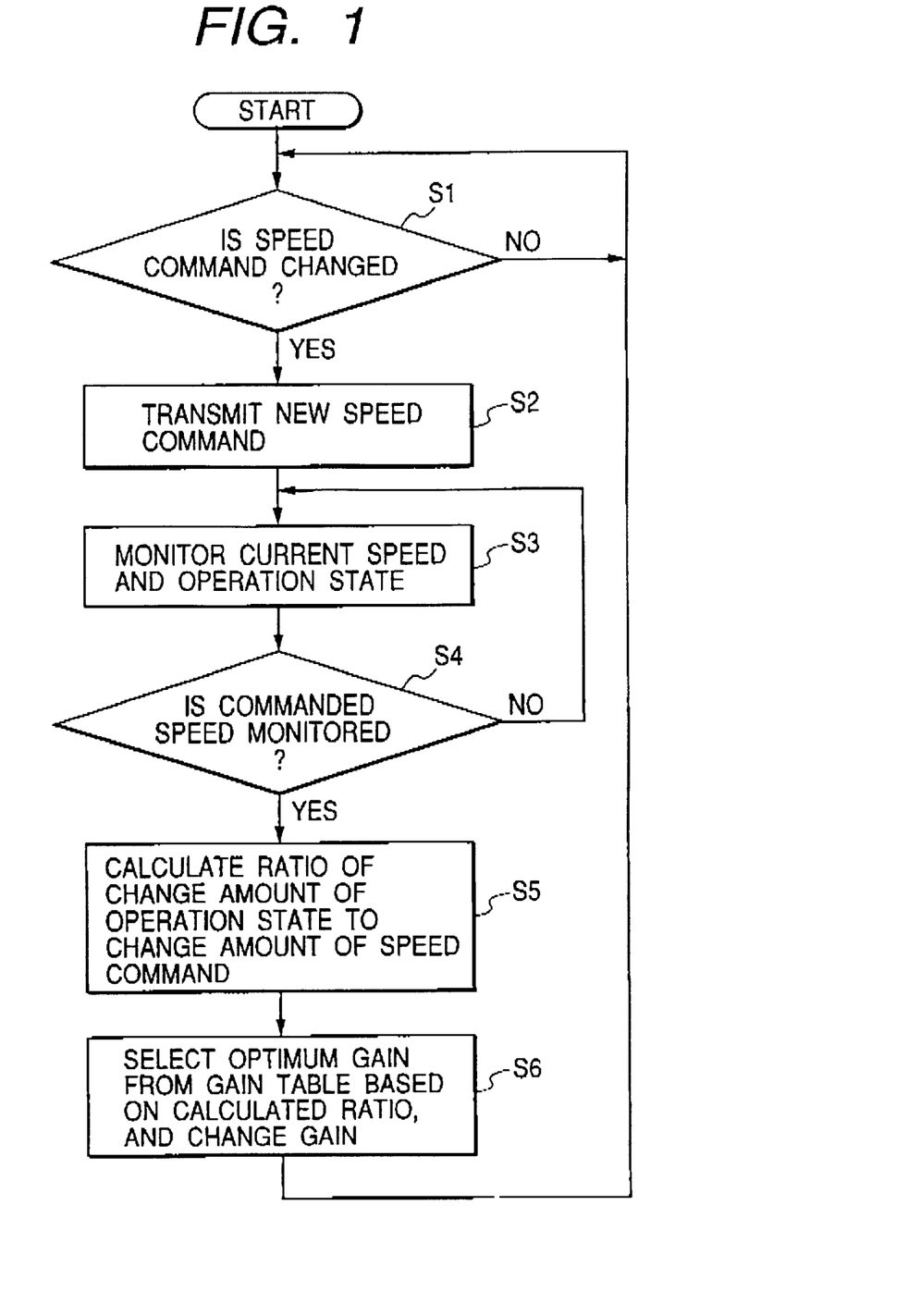
FIG. 1 is a flow chart showing a speed control gain setting procedure executed by a CPU in the first embodiment.

FIG. 1 is a flow chart showing a speed control gain setting procedure executed by the CPU 7 in the first embodiment.

Assume that the CPU 7 receives a command from a command means (not shown) to change one of the rotational speeds of the vibration type actuators 4, 5, and 6 while they are rotating at predetermined speeds. In this case, in accordance with the flow chart of FIG. 1, the CPU 7 performs processing for the vibration type actuator for which the speed changing command is received, and changes the control gain. A case wherein a speed command for the vibration type actuator 4 is changed will be described below.

If the speed command transmitted from the command means (not shown) to the CPU 7 is changed (step S1), the CPU 7 transmits a new speed command to the operation control circuit 1 using the signal Rxd (step S2). Since this operation command is issued to the operation control circuit 1, the command contains the identification code of ID number 0. The operation control circuit 1 changes, for example, the frequency in accordance with the speed command. Upon changing the speed command, the CPU 7 sends a monitor command to the operation control circuit 1 using the signal Rxd to monitor the rotational speed and operation state (e.g., the corresponding frequency) of the vibration type actuator 4, and acquires the respective values using the signal Txd (step S3). The monitor command is periodically sent until the rotational speed of the vibration type actuator 4 reaches the speed commanded by the speed command (step S4).

If the rotational speed of the vibration type actuator 4 reaches the target speed, the CPU 7 calculates the ratio of the change amount of operation state (frequency) to the change amount of rotational speed of the vibration type actuator 4 (step S5). The CPU 7 then looks up an optimum gain table to read out a control gain corresponding to the ratio calculated in step S5, and transmits the new control gain to the operation control circuit 1 using the signal Rxd, thus setting the gain (step S6) In the optimum gain table, optimum control gains are set in advance in correspondence with the respective ratios of the change amounts of rotational speed of each vibration type actuator to the change amounts of operation state (frequency).

Optimum control gains will be described below.

Figure 8:
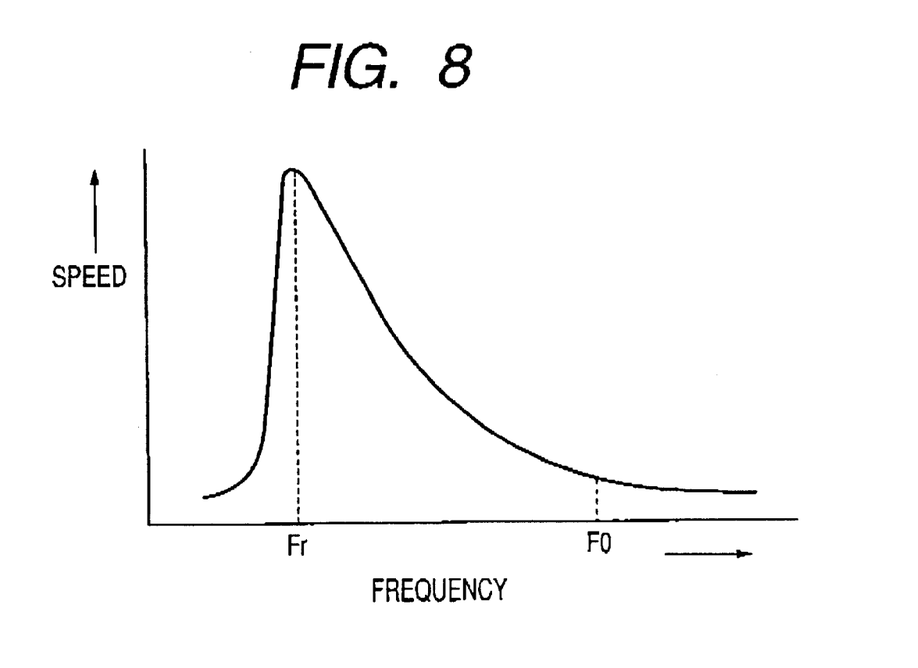
FIG. 8 is a graph showing the rotational speed characteristics of the vibration type actuator with respect to the driving frequency.

The rotational speed of each vibration type actuator increases as the driving voltage to be applied rises, the driving frequency approaches the resonance frequency of the vibration member, and the phase difference approaches a predetermined value (90° in most vibration type actuators to which two-phase driving voltages are applied). The ratio of the change amount of each of these parameters to the change amount of rotational speed may be nonlinear, temperature-dependent, varies among actuators, or changes over time. FIG. 8 is a graph showing the relationship between the driving frequency and the rotational speed of each vibration type actuator, as will be described later. As is obvious from this graph, the slope of the characteristic curve changes with the rotational speed.

Figure 14:
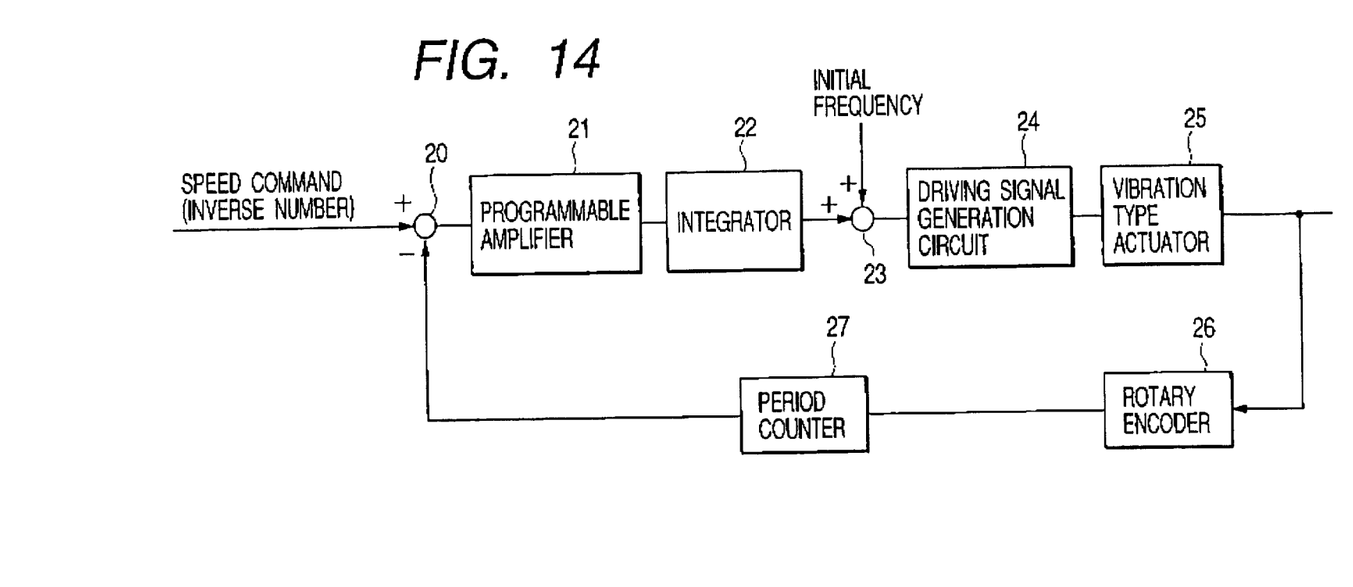
FIG. 14 is a block diagram showing an example of a speed. control system.

FIG. 14 is a block diagram showing an example of a speed control system forming an operation control circuit.

Referring to FIG. 14, a subtracter 20 outputs the difference between a value proportional to the inverse number of the speed commanded by the command means (not shown) and an output from a period counter 27 (to be described later). A programmable amplifier 21 amplifies the output from the subtracter 20 with the set control gain (in step S6). An integrator 22 integrates the output from the programmable amplifier 21. An adder 23 adds the initial frequency set by a setting means (not shown) to the output from the integrator 22. A driving signal generation circuit 24 generates a two-phase AC voltage with a frequency corresponding to the output from the adder 23. A vibration type actuator 25 is driven by the output from the driving signal generation circuit 24. A rotary encoder 26 detects the rotational speed of the vibration type actuator 25. The period counter 27 detects the period of an output pulse from the rotary encoder 26.

The operation of this control system will be described below.

The subtracter 20 converts a target speed into a value corresponding to the output signal period of the rotary encoder 26 and subtracts the output signal period of the rotary encoder 26, which is obtained by the period counter 27, from the converted value instead of subtracting the actual speed from the target speed. Since subtraction is based on periods, if the actually detected speed is lower than the target speed, the subtracter 20 outputs a negative value. Since the integrator 22 integrates negative values, the values are integrated in the negative direction. As a consequence, the output from the adder 23 changes toward lower frequencies. The above initial frequency is F0 in FIG. 8, and the driving frequency output from the driving signal generation circuit 24 gradually changes from the frequency F0 to a resonance frequency Fr. The vibration type actuator 25 therefore gradually accelerates toward the target speed.

Consider an open loop gain of this control system. In this case, since the loop gain contains the slope of the characteristic curve in FIG. 8 for each speed, which corresponds to a change in rotational speed with a change in frequency, the control system has different open loop gains depending on the speeds. In addition, a speed difference is obtained by using a value proportional to the inverse number of a speed. This is a factor that produces different open loop gains depending on the speeds.

Consider a control gain from the viewpoint of an optimum control gain. In this case, since the speed differences decreases with a decrease in commanded speed, the control gain is increased when the commanded speed is low, and the control gain is decreased when the commanded speed is high. The increased or decreased amount of control gain is likely to depend on an application to which each vibration type actuator is connected, and hence Is set by actual measurement.

Under the above circumstances, optimum gains determined by corrections made for the inverse numbers of the periods determined by commanded speeds and the magnitudes of speed commands are obtained in advance by experiments. With a change in rotational speed corresponding to the driving frequency of the vibration type actuator 25 owing to differences among actuators or a change over time, the control gain must be adjusted to keep the rotational speed corresponding to the driving frequency constant in accordance with the slope of this change. More specifically, the control gain is decreased when the slope is larger than a predetermined value, and the control gain is increased when the slope is smaller than the predetermined value. The slope of the above characteristic curve is calculated from a change in rotational speed corresponding to the driving frequency near the commanded speed of the vibration type actuator 25 during driving, thus adjusting the control gain. For example, when a commanded speed is changed, a lower gain is selected as an optimum gain from the table as the ratio of the amount of frequency change that has caused the speed change to the difference between the previous speed and the new speed increases.

Assume that the slope of the characteristic curve is detected while the actuator is accelerated in start-up operation, and the speed command is increased to the final target speed while speed control is performed. In this case, if the speed control gain during acceleration is excessively high, the slope cannot be detected in some case because the actuator is excited during acceleration. In accordance with a commanded speed or final target speed, therefore, a control gain must be set in an expected range in which no excitation occurs.

Note that the above operation state is expressed by a parameter for controlling the rotational speed of the vibration type actuator, and includes all parameters that can be used to change the rotational speed (including the average speed) of the vibration type actuator, e.g., the amplitude, phase, and pulse width of a driving voltage and the duty of a switching pulse in addition to the driving frequency. If, for example, the rotational speed is to be changed by changing the amplitude of a voltage in accordance with a speed command, the operation state is the amplitude of the voltage.

Note that the above ratio may be the ratio of the difference between operation states before and after a speed command from the command means (not shown) to the difference between commanded speeds is changed, or the ratio of the change amount, between predetermined timing during acceleration, of operation state to that of actual rotational speed. Alternatively, if a parameter that changes with the actual rotational speed, like the pulse period of an output signal which changes with a change in actual rotational speed, is to be detected by using a rotary encoder or the like, the change amount of this parameter may be used in place of the change amount of actual rotational speed In case of a small change amount of speed command, noise components contained in change information may have adverse effects, so the control gain may not be changed. This can prevent erroneous setting of a control gain.

In the result of performing the above operation, a control gain can be corrected in accordance with the characteristics of each vibration type actuator and variations in characteristics, and hence optimum speed control can always be maintained even if different optimum control gains are set depending on the vibration type actuators due to differences between the characteristics of the respective vibration type actuators or the optimum control gain varies owing to changes in the characteristics of each vibration type actuator over time or variations in characteristics due to changes in ambient temperature.

(Second Embodiment)

Figure 4:
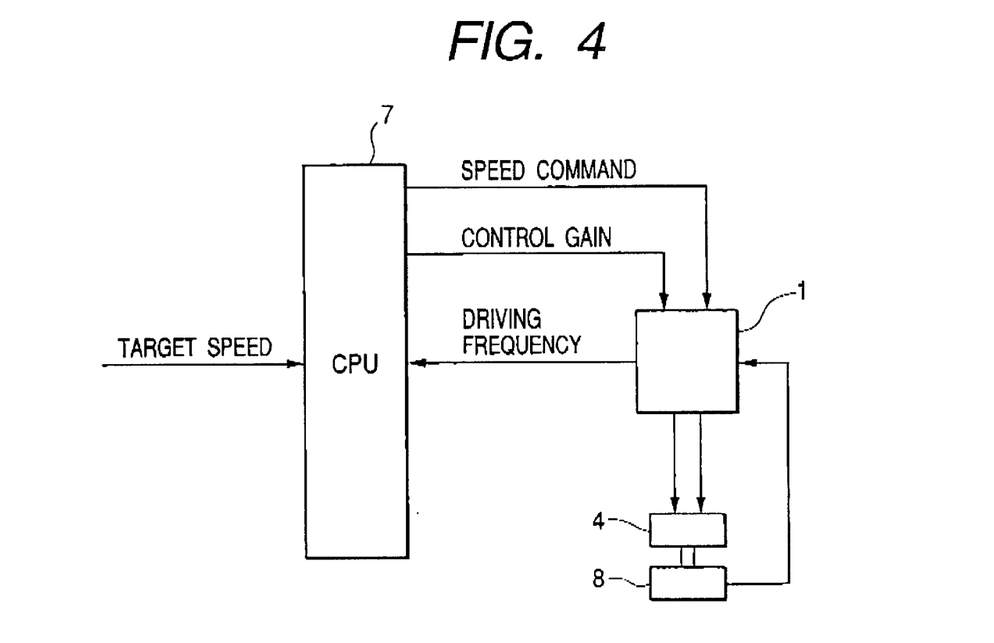
FIG. 4 is a block diagram showing the arrangement of a driving control device for a vibration type actuator according to the first embodiment.

FIG. 4 is a block diagram showing the arrangement of a driving control device for a vibration type actuator according to the second embodiment of the present invention. Since the arrangement of the second embodiment is basically the same as that of the first embodiment, the same reference numerals as in the second embodiment denote the same parts in the first embodiment, and a description thereof will be omitted.

In the second embodiment, a CPU 7 sends a speed command and control gain information to an operation control circuit 1, and the operation control circuit 1 controls the frequency of a driving voltage to be applied to a vibration type actuator 4 in accordance with the sent speed command and control gain information.

Figure 3:
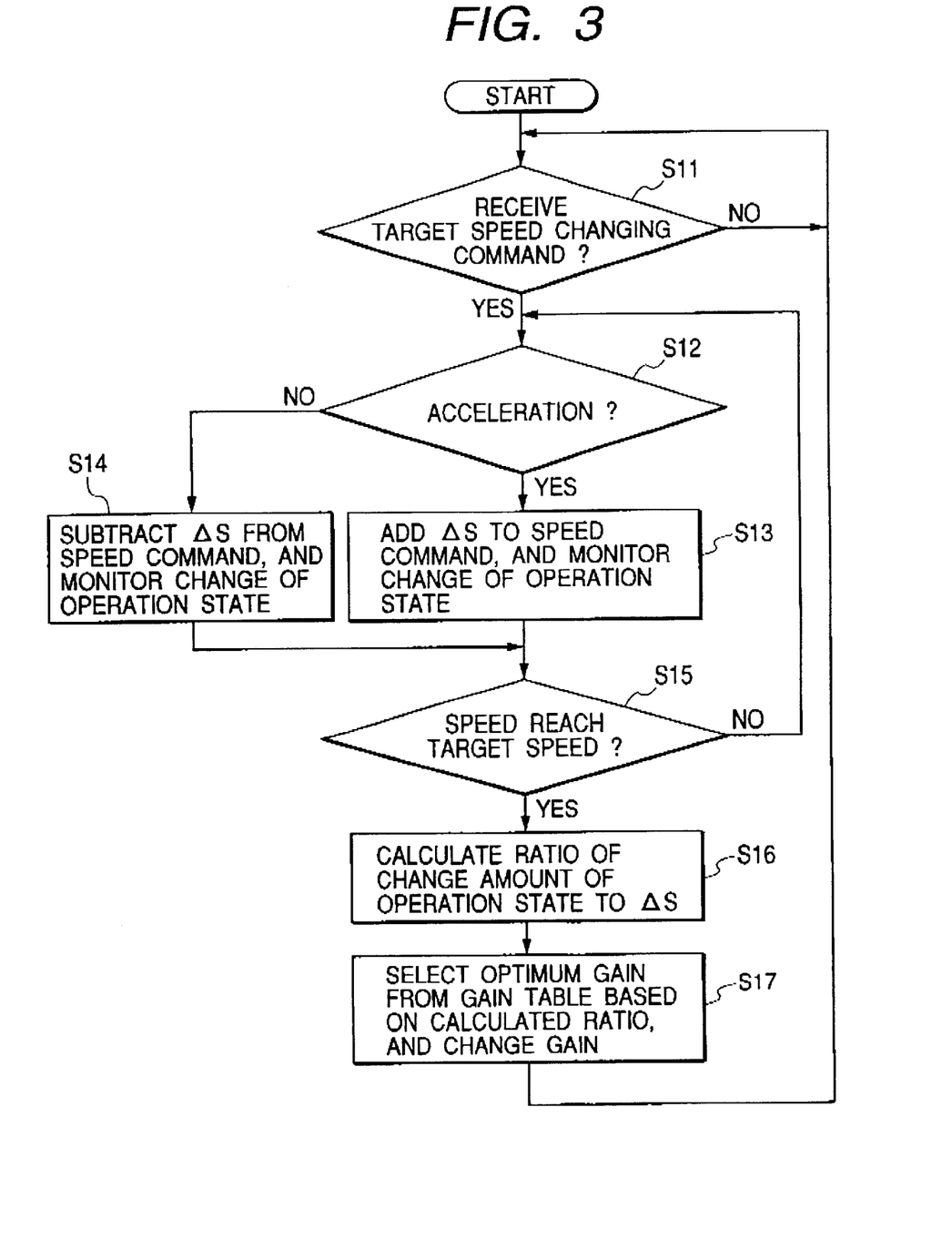
FIG. 3 is a flow chart showing a speed control gain setting procedure executed by a CPU in the second embodiment.

FIG. 3 is a flow chart showing a speed control gain setting procedure executed by the CPU 7 in the second embodiment.

Upon reception of a target speed changing command from a command means (not shown) (step S1), the CPU 7 gradually brings a speed command close to the target speed in units of ΔS at predetermined timings, and monitors changes in the driving frequency of a voltage for driving the vibration type actuator 4 (steps S12 to S14). When the speed command finally reaches the target speed (step S15), the CPU 7 calculates the ratio of the change amount of driving frequency at the instant when the speed command has reached the target speed to ΔS (step S16). The CPU 7 then calculates a control gain corresponding to this ratio from an optimum gain table and sets it in the operation control circuit 1 (sets a gain in an amplifier 21).

In this manner, the ratio of the change amount of driving frequency near the target speed to the change amount of rotational speed of the vibration type actuator 4 is actually measured, and a control gain is set on the basis of this ratio. This makes it possible to set a control gain with higher precision than in the first embodiment.

As a control gain to be set when the vibration type actuator 4 is to be started from a stopped state, a predetermined control gain value or a control gain corresponding to a predetermined speed set during operation is used.

The "control gain" in this case may include various parameters used for various types of control operations, e.g., proportional control, integral control, and proportional-plus-integral control, as well as the gain of the amplifier described above. That is, this control gain is a numerical value by which the difference between the target value and the actually measured value of a control target is directly or indirectly multiplied. For example, in integral control, a numerical value by which the difference between a target value and an actually measured value is multiplied or by which the integration of the difference is multiplied is called a gain.

(Third Embodiment)

Since the arrangement of the third embodiment is the same as that of the second embodiment, a description of thereof will be omitted by using the arrangement of the second embodiment. The third embodiment differs from the second embodiment in the speed control gain setting procedure executed by a CPU 7.

Figure 5:
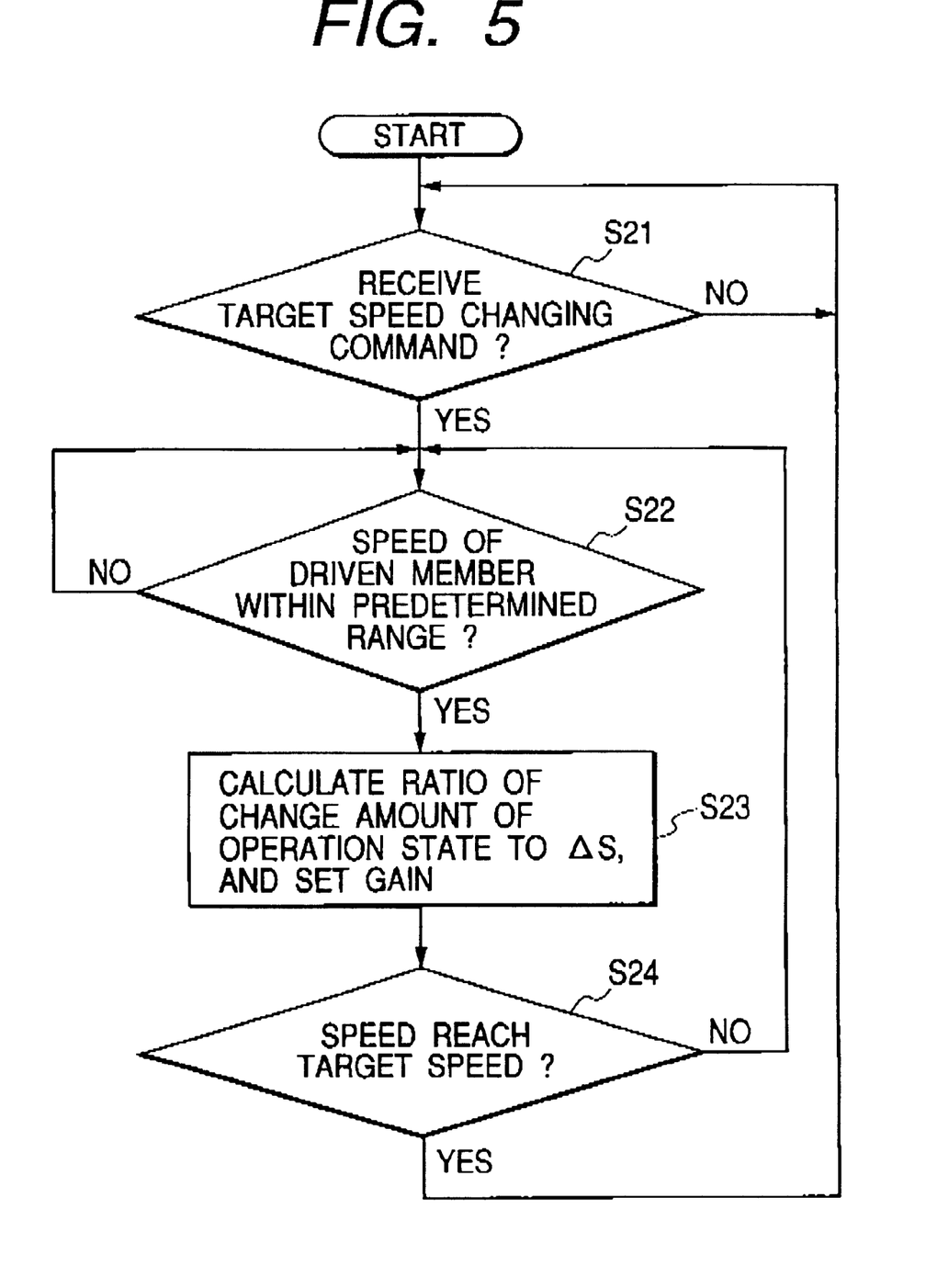
FIG. 5 is a flow chart showing a speed control gain setting procedure executed by a CPU in the third embodiment.

FIG. 5 is a flow chart showing the speed control gain setting procedure executed by the CPU 7 in the third embodiment.

Upon reception of a target speed changing command from a command means (not shown) (step S21), the CPU 7 gradually brings a speed command close to the target speed in units of predetermined speeds at predetermined timings, and monitors changes in the driving frequency of a voltage for driving a vibration type actuator 4.

In this case, every time the moving speed of a driven member driven by the vibration type actuator 4 reaches one of a plurality of speed values set in advance at intervals of ΔS (step S22), the CPU 7 calculates the ratio of the change amount of driving frequency that has changed during movement of the driven member between adjacent speed values to ΔS, and sets a control gain corresponding to this ratio from an optimum gain table (step S23). Such setting is executed every time the moving speed reaches a speed value set at intervals of ΔS until the speed command reaches the target speed (step S24).

In the result of performing the above operation, the ratio of the change amount of driving frequency near a plurality of speeds to the change amount of rotational speed of the vibration type actuator 4 is actually measured, and a control gain is set on the basis of this gain. This makes it possible to decrease the number of times the control gain is changed.

In this case, a control gain is obtained from the optimum gain table. However, a control gain may be calculated by multiplying the ratio of the change amount of driving frequency to ΔS by a predetermined value instead of using the optimum gain table. In this case, if the calculated control gain exceeds a predetermined range, the value of the control gain may be limited within the predetermined range.

Assume that when the rotational speed changes from 10 rpm to 20 rpm, the driving frequency changes from 35 kHz to 34.7 kHz. In this case, 300/10=30 is calculated as the above ratio, and a control gain is calculated by multiplying this ratio by a predetermined value. Assume also that when the rotational speed changes from 30 rpm to 40 rpm, the driving frequency changes from 34.5 kHz to 34.3 kHz. In this case, 200/10=20 is calculated as the above ratio, and a control gain is calculated by multiplying this ratio by the same predetermined value. In the former case, the rotational speed increases by 10 rpm with a driving frequency change of 300 Hz, whereas in the latter case, the rotational speed changes by 10 rpm with a driving frequency change of 200 Hz. This indicates that the rotational speed change with the same frequency change in the latter case is larger than that in the former case. Therefore, control gains are respectively calculated by multiplying 30 and 20 by the same predetermined value in the former and latter cases. With this operation, the control gain in the former case is set to be higher than that in the later case, thereby correcting the nonlinear characteristics of the vibration type actuator.

In addition, in this embodiment, the rotational speed of the vibration type actuator, i.e., the moving speed of the driven member, is controlled by changing the driving frequency. However, the rotational speed of the vibration type actuator can also be controlled by changing the amplitude, pulse width, phase, or the like of a driving voltage. In controlling the rotational speed by changing any of these parameters, if a control gain is set on the basis of the ratio of a parameter change to a speed change, or, for example on the basis of the ratio of the change amount of amplitude of a driving voltage to the change amount of rotational speed, the same effect as that described above can be obtained.

(Fourth Embodiment)

Figure 7:
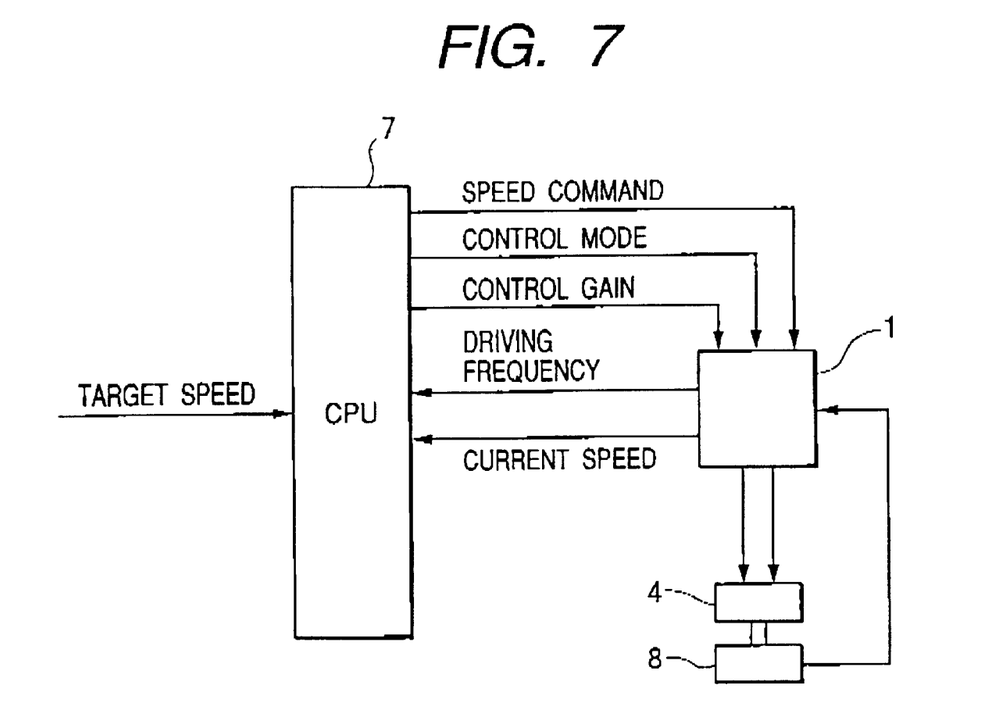
FIG. 7 is a block diagram showing the arrangement of a driving control device for a vibration type actuator according to the fourth embodiment.

FIG. 7 is a block diagram showing the arrangement of a driving control device for a vibration type actuator according to the fourth embodiment of the present invention. Since the arrangement of the fourth embodiment is basically the same as that of the first embodiment, the same reference numerals as in the first embodiment denote the same parts In the fourth embodiment, and a description thereof will be omitted.

In the fourth embodiment, a CPU 7 sends a speed command, control gain information, and control mode information to an operation control circuit 1, and the operation control circuit 1 controls the frequency of a driving voltage to be applied to a vibration type actuator 4 in accordance with the sent information.

Figure 6:
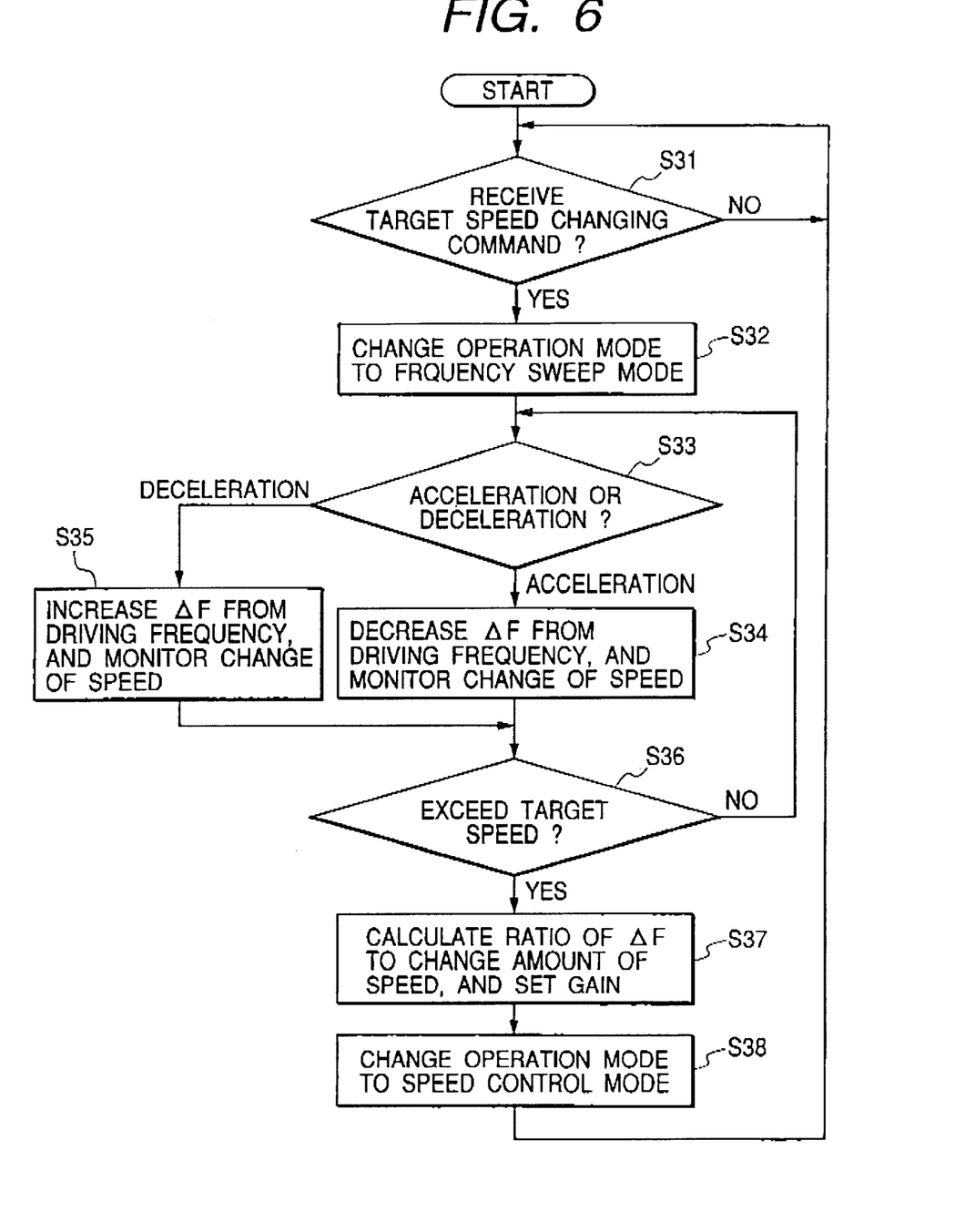
FIG. 6 is a flow chart showing a speed control gain setting procedure executed by a CPU in the fourth embodiment.

FIG. 6 is a flow chart showing a speed control gain setting procedure executed by the CPU 7 in the fourth embodiment.

When the CPU 7 receives a target speed changing command from a command means (not shown) (step S31), the operation mode of the CPU 7 is changed to a frequency sweep mode (step S32). If the target speed is higher than the current speed, the CPU 7 performs acceleration, and if lower, the CPU 7 performs decceleration (step S33). In acceleration, a driving frequency command is issued to decrease the driving frequency in units of ΔF at predetermined timings (step S34). In deceleration, a driving frequency command is issued to increase the driving frequency in units of ΔF at predetermined timings (step S35).

FIG. 8 is a graph showing the rotational speed characteristics of the vibration type actuator with respect to the driving frequency. In general, control is performed in a frequency region higher than a resonance frequency Fr. As the driving frequency decreases, the rotational speed increases, and as increase, the rotational speed decreases.

Driving frequency sweep operation is performed until the rotational speed reaches the target speed while monitoring the current speed (step S36), and also measures a change in rotational speed in accordance with a change ΔF in driving frequency until the rotational speed reaches the target speed (steps S34 and S35). When the rotational speed reaches the target speed, the CPU 7 calculates the ratio of ΔF to the change amount of rotational speed, calculates a control gain corresponding to the ratio from an optimum gain table, and sets the control gain into the operation control circuit 1 (step S37). Then the current operation mode is switched to a speed control mode (step S38).

With the above operation, a control gain can be corrected in accordance with the characteristics of each vibration type actuator and variations in characteristics, and hence optimum speed control can always be maintained even if different optimum control gains are set depending on the vibration type actuators due to differences between the characteristics of the respective vibration type actuators or the optimum control gain varies owing to changes in the characteristics of each vibration type actuator over time or variations in characteristics due to changes in ambient temperature.

In this case, the rotational speed is controlled by changing the driving frequency. However, the rotational speed can also be controlled by controlling the amplitude of a driving voltage. This operation will be described with reference to FIG. 9.

Figure 9:
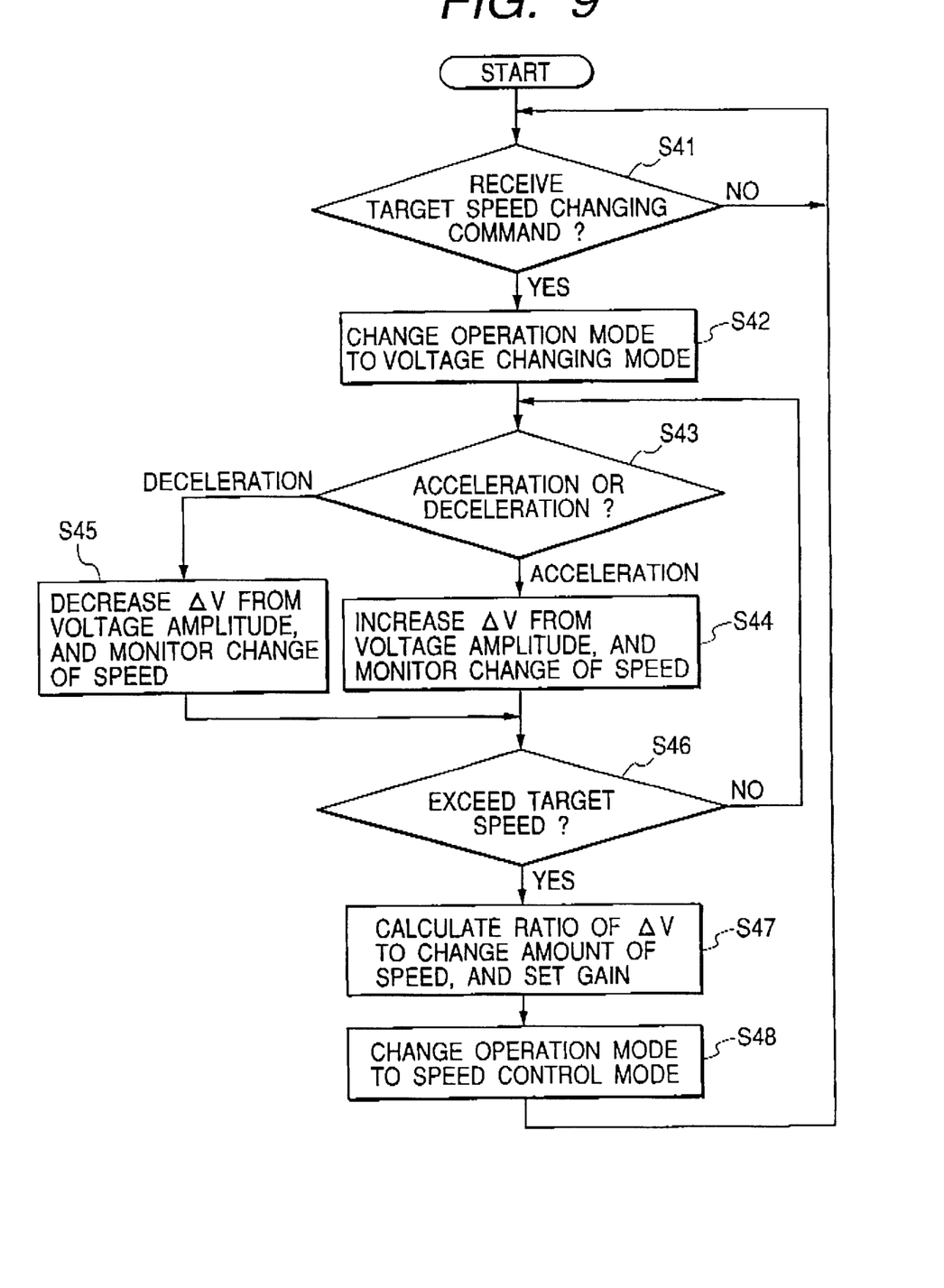
FIG. 9 is a flow chart showing a procedure whose contents partly differ from those of the speed control gain setting procedure shown in FIG. 6.

FIG. 9 is a flow chart showing a procedure whose contents partly differ from those of the speed control gain setting procedure shown in FIG. 6.

FIG. 9 shows a speed control gain setting procedure in a case wherein the rotational speed of a vibration type actuator is controlled by changing the amplitude of a driving voltage.

The procedure shown in FIG. 9 is basically the same as that shown in FIG. 6 except that ΔF (the change amount of driving frequency) is replaced with ΔV (the change amount of driving voltage). In addition, acceleration is made by decreasing the driving frequency in the procedure shown in FIG. 6, whereas acceleration is made by increasing the driving voltage in the procedure shown in FIG. 9.

Note that if speed control is performed by changing both the driving frequency and the driving voltage, a control gain is changed on the basis of at least one of the changing operations.

(Fifth Embodiment)

Figure 10:
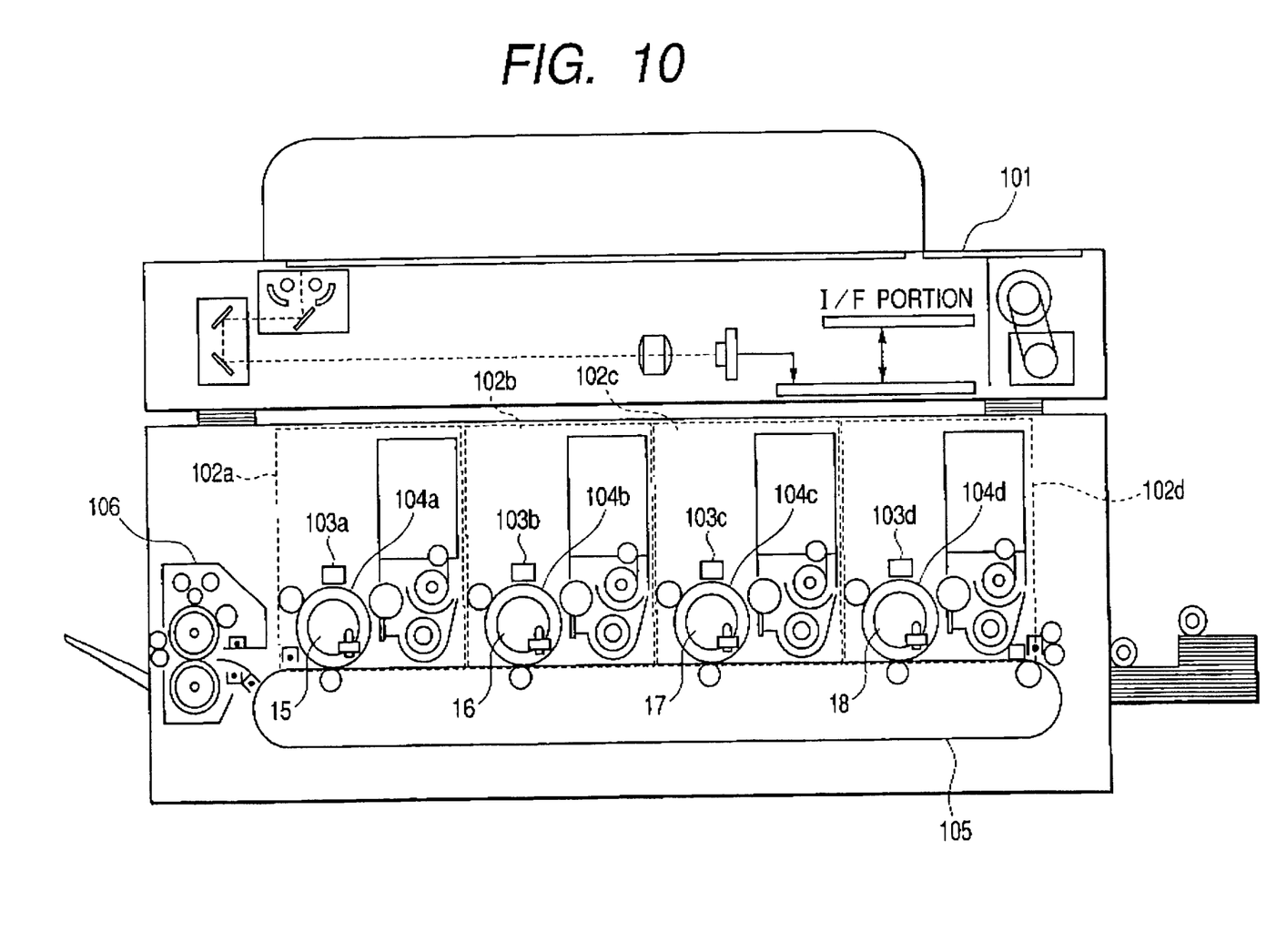
FIG. 10 is a sectional view showing the arrangement of a color copying machine incorporating one of the vibration type actuator driving control devices of the first to fourth embodiments.

FIG. 10 shows the arrangement of a color copying machine incorporating one of the vibration type actuator driving control devices according to the first to fourth embodiments.

Referring to FIG. 10, a reader unit 101 reads an original. Image forming units 102a, 102b, 102c, and 102d are respectively comprised of LED arrays 103a, 103b, 103c, and 103d, chargers, photosensitive drums 104a, 104b, 104c, and 104d, and the like. Vibration type actuators 15, 16, 17, and 18 are respectively connected to the photosensitive drums 104a, 104b, 104c, and 104d. Rotary encoders serving as speed sensors are respectively incorporated in the vibration type actuators 15, 16, 17, and 18.

The image read by the reader unit 101 is developed by the photosensitive drums 104a, 104b, 104c, and 104d. The image forming units 102a, 102b, 102c, and 102d respectively develop yellow, magenta, cyan, and black images. A full-color copy can be made by synthesizing the above four color images.

A transfer belt 105 conveys a recording sheet. The recording sheet is conveyed on the transfer belt 105 to pass through the image forming units 102a, 102b, 102c, and 102d. As a consequence, toner images of the respective colors are transferred onto the sheet. A fixing unit 106 fixes the toner images formed on the recording sheet by using a heated fixing roller. Note that a vibration type actuator may also be connected to the driving unit of the transfer belt 105.

Figure 11:
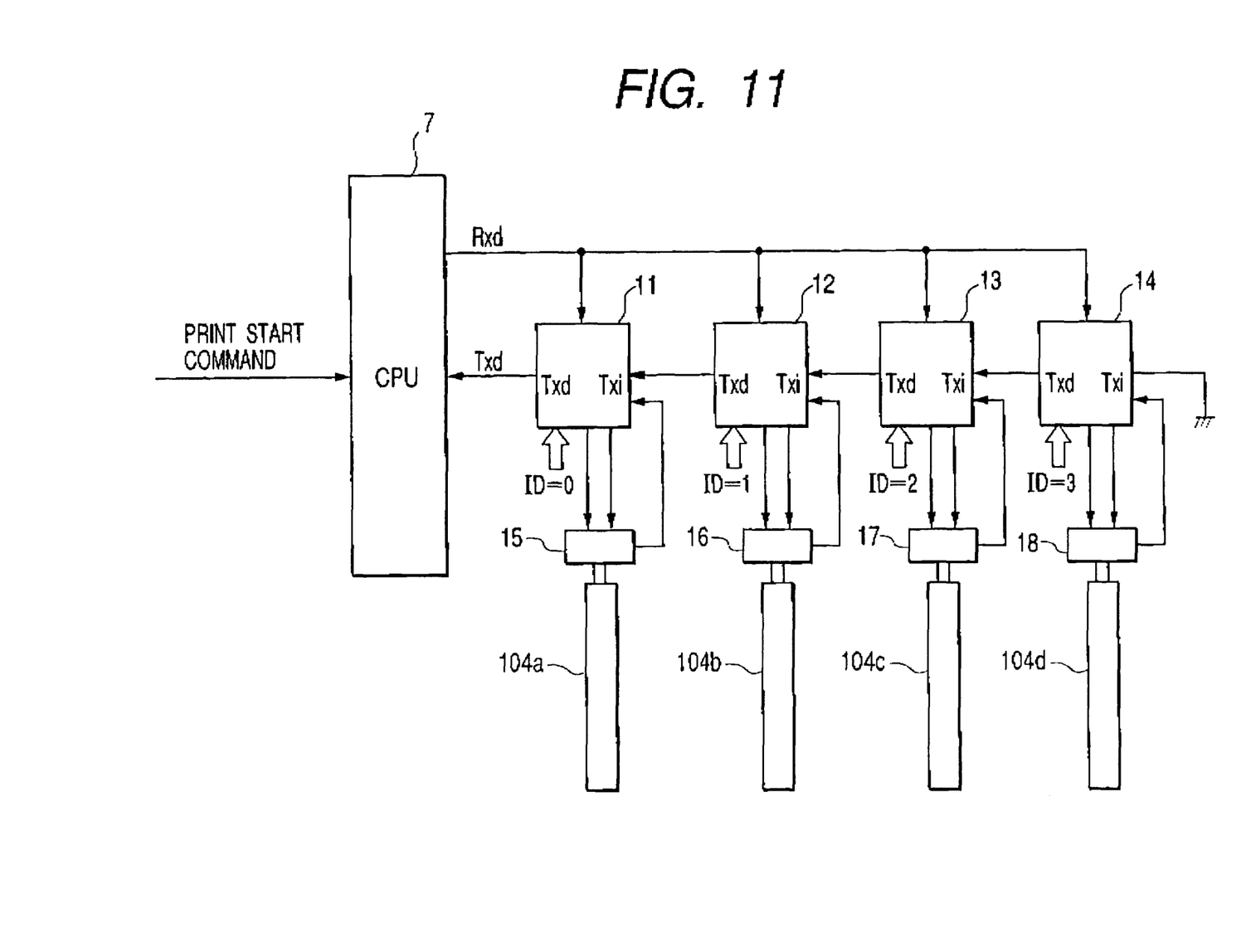
FIG. 11 is a block diagram showing the arrangement of a control device for driving/controlling vibration type actuators.

FIG. 11 is a block diagram showing the arrangement of a control device for driving/controlling vibration type actuators 15, 16, 17, and 18.

Referring to FIG. 11, operation control circuits 11, 12, 13, and 14 respectively control the speeds of the vibration type actuators 15, 16, 17, and 18. A CPU 7 transmits operation commands to the operation control circuits 11, 12, 13, and 14 using signals Rxd. ID numbers 0, 1, 2, and 3 are respectively assigned to the operation control circuits 11, 12, 13, and 14, and ID numbers are added to operation commands. Therefore, the operation control circuits for which operation commands are destined can be identified by ID numbers sent together with the operation commands. Information and the like about the operation states of the vibration type actuators 15, 16, 17, and 18 are periodically sent to the CPU 7 using signals Txd.

Figure 12:
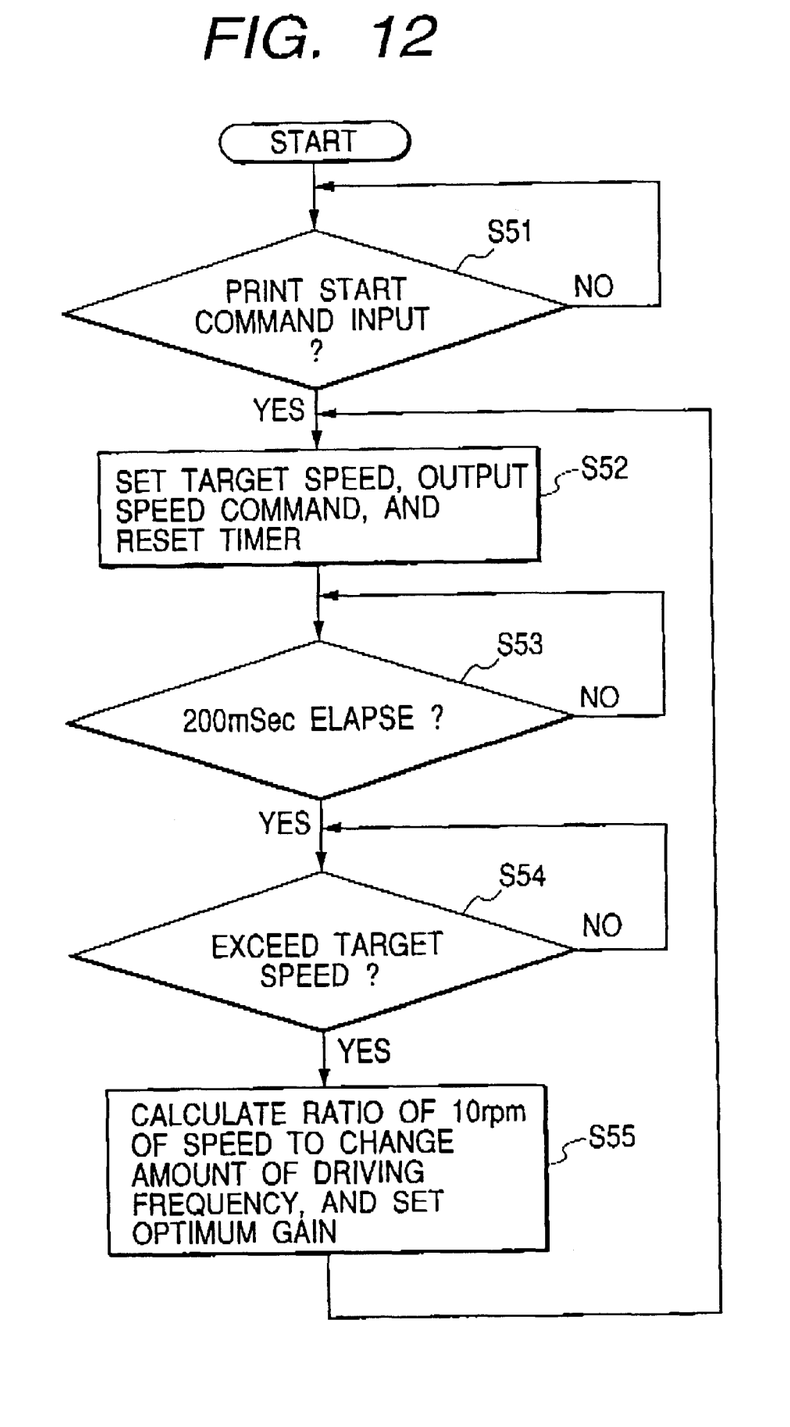
FIG. 12 is a flow chart showing the operations of the color copying machine and vibration type actuator driving control device.

FIG. 12 is a flow chart showing the operations of the color copying machine and vibration type actuator driving control device.

Upon reception of a print start command from a command means (not shown) (step S51), the CPU 7 outputs speed commands to the operation control circuits 11, 12, 13, and 14 by serial communication at predetermined time intervals in accordance with a speed pattern written in an acceleration table (step S52). Different speed patterns may be set for acceleration and deceleration, or the same pattern may be used.

Figure 13:
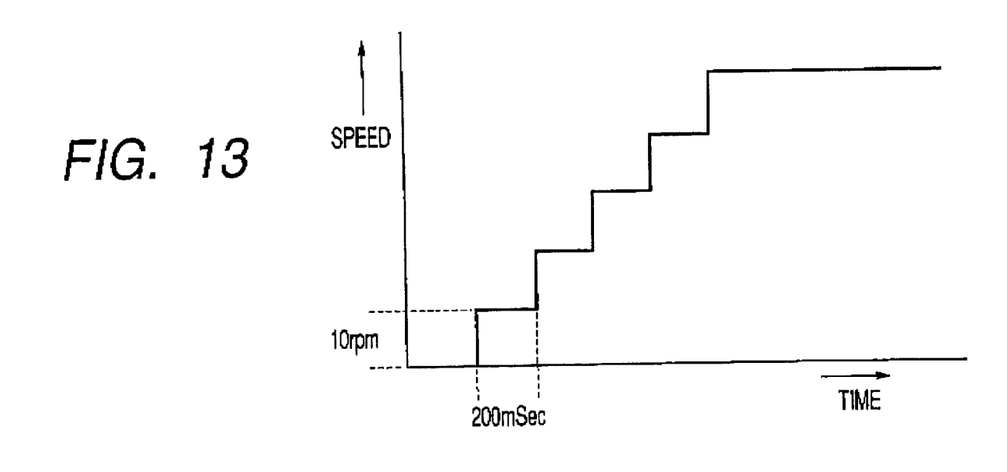
FIG. 13 is a graph showing a speed pattern for acceleration.

FIG. 13 shows a speed pattern for acceleration, in which a commanded speed is increased 10 rpm at a time intervals of 200 msec.

The operation control circuits 11, 12, 13, and 14 respectively control the rotational speeds of the vibration type actuators 15, 16, 17, and 18 by changing the frequencies of driving voltages to be applied to the vibration type actuators 15, 16, 17, and 18. As a speed control gain in start-up operation, each operation control circuit uses a predetermined fixed gain or a control gain set immediately before the previous driving operation is stopped. The speed commands are basically updated at intervals of 200 msec (step S53) until all the rotational speeds of the vibration type actuators 15, 16, 17, and 18 reach target speeds (step S54).

The CPU 7 then monitors a change in the driving frequency sent from each of the operation control circuits 11, 12, 13, and 14 using the signal Txd, calculates the ratio of 10 rpm which is the change amount of rotational speed to the change amount of driving frequency, multiplies the ratio by a predetermined value, thereby calculating a control gain (step S55). In this case, the upper and lower limits are set for control gains. In addition, control gains are independently set for the respective vibration type actuators 15, 16, 17, and 18, and hence the vibration type actuators 15, 16, 17, and 18 are respectively controlled by optimum speed control gains. As a consequence, high-precision speed control is performed to form a high-quality image with little color misregistration.

Note that since high-precision speed control is required only during image formation, control gains need not be changed during acceleration or deceleration of the vibration type actuators.

Alternatively, control gains may be optimized the first time a sheet is conveyed after the copying machine is powered on, and may not be changed until the machine is powered off. Sheet convey speed and load conditions vary depending on the thicknesses and materials of sheets. Assume that different kinds of sheets are to be conveyed. In this case, control gains may be optimized if a given sheet is conveyed for the first time after power-up, and optimum gains may be set for each kind of sheet. Furthermore, initialization upon power-up may be simulated with respect to all convey speeds, and optimum gains may be set for the respective convey speeds. Alternatively, initialization may be periodically performed or may be performed in accordance with an initialization command input through an external operation panel or network.

What is claimed is:

1. A control device for a vibration type actuator, which applies an AC signal to an electro-mechanical energy conversion element so as to obtain a driving force by exciting a vibration member, comprising:

an operation control circuit which determines the AC signal to be applied with respect to an input control signal, in accordance with a control gain, and controls operation of said vibration type actuator;

a speed commanding circuit which generates a changing command for an operation speed of the actuator;

a changing circuit which changes a value of the control signal in accordance with the changing command for the operation speed; and a processor which determines the control gain on the basis of a relationship between a change amount of the value of the control signal and a change amount of speed, wherein said speed commanding circuit commands speed information associated with a speed to be changed.

2. A device according to claim 1, wherein said control gain determining processor determines the control gain on the basis of a relationship between a speed difference between a current speed of the actuator and a commanded speed and a change amount of the value of the control signal until the current speed reaches the commanded speed.

3. A device according to claim 1, wherein said control gain determining processor determines the control gain on the basis of a ratio of the change amount of the value of the control signal to the change amount of speed.

4. A device according to claim 1, wherein said control device further comprises a speed detecting circuit which detects the operation speed of the actuator, and said control gain determining processor determines the control gain on the basis of a relationship between a change amount of speed detected by said detecting circuit and a change amount of the value of the control signal that results in the change amount of speed.

5. A device according to claim 1, wherein said control gain determining processor determines the control gain on the basis of a change amount of speed of said actuator when the value of the control signal changes a predetermined amount.

6. A device according to claim 1, wherein said control gain determining processor determines a control gain by looking up a gain table, in which control gains are set, on the basis of a ratio of the change amount of the value of the control signal to the change amount of speed.

7. A device according to claim 1, wherein said control gain determining processor limits the control gain within a predetermined range.

8. A device according to claim 1, wherein said actuator is used to drive a photosensitive drum or paper covey roller of an image forming apparatus.

9. A device according to claim 8, wherein said control gain determining processor performs gain determining operation when said image forming apparatus is powered on.

10. A device according to claim 8, wherein said control gain determining processor performs gain determining operation every time another kind of sheet is conveyed by said image forming apparatus.

11. A driving device for a vibration motor, which applies a frequency signal to an electro-mechanical energy conversion element so as to obtain a driving force by exciting a vibration member, comprising:

a driving control circuit which receives a control signal and determines an output state of the vibration motor in accordance with the control signal and a control gain; and control gain determining means which determines the control gain in accordance with a ratio of a change amount of the control signal to a change amount of the output state of the vibration motor, wherein the ratio corresponds to a change amount of the control signal in an interval during which the output state of the vibration motor changes from a given state to another predetermined state.

12. A driving device according to claim 11, wherein the control signal is a signal for determining a frequency or amplitude of the frequency signal.

13. A driving device for a vibration motor, which applies a frequency signal to an electro-mechanical energy conversion element so as to obtain a driving force by exciting a vibration member, comprising:

a driving control circuit which receives a control signal and determines an output state of the vibration motor in accordance with the control signal and a control gain; and control gain determining means which determines the control gain in accordance with a ratio of a change amount of the control signal to a change amount of the output state of the vibration motor, wherein the ratio corresponds to a change amount of the output state of the vibration motor when the control signal changes a predetermined amount.

* * * * *

UNITED STATES PATENT AND TRADEMARK OFFICE
CERTIFICATE OF CORRECTION

PATENT NO.    : 6,376,965 B1                                                Page 1 of 1
DATED         : April 23, 2002
INVENTOR(S)   : Kenichi Kataoka et al.

It is certified that error appears in the above-identified patent and that said Letters Patent is hereby corrected as shown below:

Column 2,
Line 26, "speed." should read -- speed --.

Column 3,
Line 60, "(step S6)" should read -- (step S6). --.

Column 4,
Line 66, "Is" should read -- is --.

Column 8,
Line 1, "In" should read -- in --.

Signed and Sealed this

Sixteenth Day of July, 2002

Attest:

JAMES E. ROGAN
Attesting Officer        Director of the United States Patent and Trademark Office